(12) United States Patent
Raghunandan et al.

(10) Patent No.: US 12,063,160 B1
(45) Date of Patent: Aug. 13, 2024

(54) AUTOMATED VPN LOAD BALANCER

(71) Applicant: FMR LLC, Boston, MA (US)

(72) Inventors: Palavalli Govindaraju Raghunandan, Bangalore (IN); Syed Muzamil, Bengaluru (IN); Hari Balaji Srinivasan, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/141,243

(22) Filed: Apr. 28, 2023

(51) Int. Cl.
*H04L 47/125* (2022.01)
*H04L 45/00* (2022.01)
*H04L 47/24* (2022.01)

(52) U.S. Cl.
CPC ............ *H04L 47/125* (2013.01); *H04L 45/22* (2013.01); *H04L 47/24* (2013.01)

(58) Field of Classification Search
CPC ........ H04L 47/125; H04L 45/22; H04L 47/24
See application file for complete search history.

(56) References Cited

U.S. PATENT DOCUMENTS

| | | | | |
|---|---|---|---|---|
| 2018/0337854 A1* | 11/2018 | Cohn | .................... | H04L 45/586 |
| 2018/0337887 A1* | 11/2018 | Aluvala | .............. | H04L 47/2433 |
| 2021/0359956 A1* | 11/2021 | Abdulla | .............. | H04L 47/6295 |
| 2022/0210130 A1* | 6/2022 | Kaciulis | .................. | H04L 69/14 |
| 2022/0255900 A1* | 8/2022 | Gupta | ................... | H04L 63/102 |
| 2023/0067990 A1* | 3/2023 | Lazauskas | ............ | G06F 9/5055 |

* cited by examiner

*Primary Examiner* — Donald L Mills
(74) *Attorney, Agent, or Firm* — Cesari & McKenna, LLP

(57) ABSTRACT

A method for automatically connecting a computing device to one of a first virtual private network (VPN) and a second VPN over a network includes receiving, by the computing device from a server system over the network, availability indicia. The method also includes obtaining, by the computing device, a priority status indicating one of a high priority and a low priority. The method further includes determining, by the computing device, a connection VPN selected from the group consisting of the first VPN and the second VPN, the determination based on at least one of the availability indicia and the priority status of the computing device. The method includes establishing, by the computing device over the network, a connection to the connection VPN. The first VPN is prioritized over the second VPN.

20 Claims, 3 Drawing Sheets

AUTOMATED VPN LOAD BALANCER

BACKGROUND

Technical Field

The present invention relates to virtual private networks (VPNs), and more particularly to automatically load-balancing connections to VPNs.

Background

Virtual private networks (VPN) are used to securely connect computing devices that are outside of a private network, such as a company network or a home network, to that private network. Especially for employees who work from home, access to a corporate network over a VPN is a necessity so that the employees can perform their work seamlessly.

In larger private networks, more than one VPN may be present to provide access to the private network. One of the VPNs may be prioritized over the others, meaning that the secondary VPN(s) is/are mainly present to provide additional resiliency against failures and/or outages of the primary VPN. Manually selecting and connecting to one of a plurality of VPNs is cumbersome, especially when one or more of the plurality of VPNs are unavailable and their availability is unknown before a connection attempt is made.

SUMMARY

The deficiencies of the prior art are overcome by providing a method and system to identify primary VPN service degradation and/or unavailability and to automatically reroute connections from a primary VPN to a secondary VPN. The embodiments described herein repeatedly determine the availability of the primary VPN infrastructure. In the event of service degradation or unavailability, the embodiments may assign high-priority users and/or devices to remaining zones of the primary VPN infrastructure and low-priority users to the secondary VPN.

In accordance with one embodiment of the present invention, a method for automatically connecting a computing device to one of a first virtual private network (VPN) and a second VPN over a network includes receiving, by the computing device from a server system over the network, availability indicia. The method also includes obtaining, by the computing device, a priority status indicating one of a high priority and a low priority. The method further includes determining, by the computing device, a connection VPN selected from the group consisting of the first VPN and the second VPN, the determination based on at least one of the availability indicia and the priority status of the computing device. The method includes establishing, by the computing device over the network, a connection to the connection VPN. The first VPN is prioritized over the second VPN.

Alternatively or in addition, the connection VPN is determined to be (1) the first VPN based on the priority status indicating a high priority; (2) the first VPN based on the priority status indicating a low priority and the availability indicia being lower than a threshold; and (3) the second VPN based on the priority status indicating a low priority and the availability indicia being equal to or higher than the threshold.

Also alternatively or in addition, the method further includes determining, by the server system, the availability indicia based on a plurality of connection zones. The availability indicia may correspond to a number of zones of the plurality of connection zones that are unreachable over the network. Further alternatively or in addition, determining the availability indicia further includes periodically attempting to connect, by the server system over the network, to each one of the zones of the plurality of connection zones.

Alternatively or in addition, the first VPN and the second VPN are selected from a plurality of VPNs. The priority status may be stored on the computing device. The method may be performed while establishing a connection, by the computing device over the network, to one of the first and second VPNs. The method may also be performed upon loss of a connection, over the network, between the computing device and one of the first and second VPNs.

Alternatively or in addition, the connection between the computing device and the connection VPN is established after a delay.

In accordance with another embodiment of the present invention, a system for automatically connecting to a VPN over a network includes a first VPN, coupled to the network, and a second VPN, coupled to the network. The first VPN is prioritized over the second VPN. The system also includes a computing device coupled to the network and having a first processor coupled to a first memory. The first processor is configured to receive, over the network, availability indicia. The first processor is also configured to obtain a priority status indicating one of a high priority and a low priority. The first processor is configured to determine a connection VPN selected from the group consisting of the first VPN and the second VPN, the determining based on at least one of the availability indicia and the priority status of the computing device. The first processor is further configured to establish, over the network, a connection to the connection VPN.

Alternatively or in addition, the first processor is configured to determine the connection VPN to be: (1) the first VPN based on the priority status indicating a high priority; (2) the first VPN based on the priority status indicating a low priority and the availability indicia being lower than a threshold; and (3) the second VPN based on the priority status indicating a low priority and the availability indicia being equal to or higher than the threshold.

Also alternatively or in addition, the system further includes a server system coupled to the network and having a second processor coupled to a second memory. The second processor is configured to determine the availability indicia based on a plurality of connection zones. The availability indicia may correspond to a number of zones of the plurality of connection zones that are unreachable over the network. The second processor may further be configured to determine the availability indicia based on periodically attempting to connect, over the network, to each one of the zones of the plurality of connection zones.

Alternatively or in addition, the first VPN and the second VPN are selected from a plurality of VPNs. The priority status may be stored on the computing device. The first processor may be configured to establish the connection between the computing device and the connection VPN after a delay.

In accordance with yet another embodiment of the present invention, a non-transitory computer-readable medium has software encoded thereon. The software, when executed by one or more computing devices coupled to a network, is operable to receive, by a computing device over the network, availability indicia. The software is also operable to obtain, by the computing device, a priority status indicating one of a high priority and a low priority. The software is further operable to determine, by the computing device, a connection virtual private network (VPN) selected from the group consisting of a first VPN and a second VPN, the determining based on at least one of the availability indicia and the priority status of the computing device. The software is also operable to establish, over the network, a connection between the computing device and the connection VPN.

Alternatively or in addition, the connection VPN is determined to be: (1) the first VPN based on the priority status indicating a high priority; (2) the first VPN based on the priority status indicating a low priority and the availability indicia being lower than a threshold; and (3) the second VPN based on the priority status indicating a low priority and the availability indicia being equal to or higher than the threshold.

BRIEF DESCRIPTION OF THE DRAWINGS

The description below refers to the accompanying drawings, of which.

DETAILED DESCRIPTION OF ILLUSTRATIVE EMBODIMENTS

Figure 1:
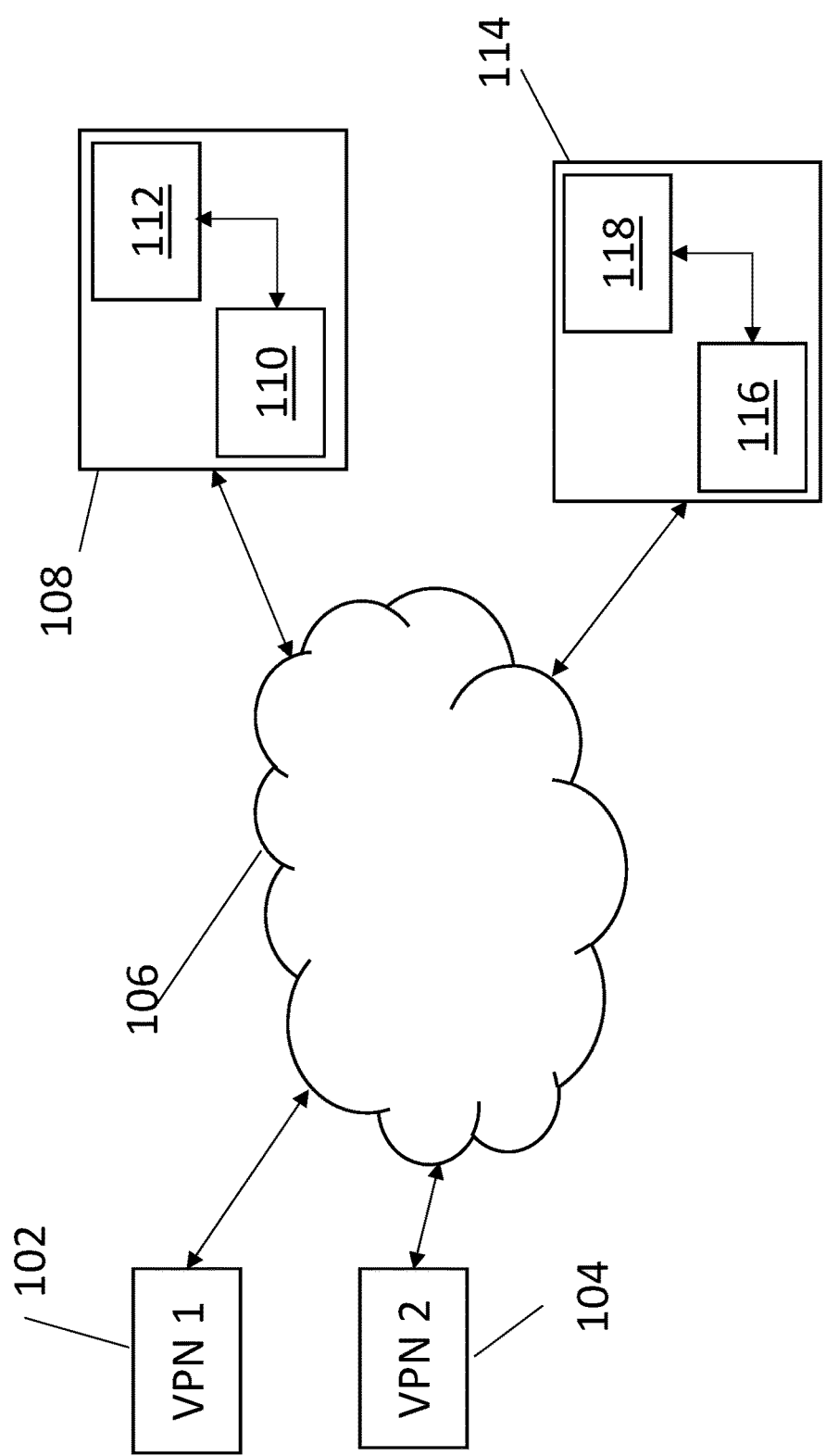
FIG. 1 is an illustration of a system for automatically connecting to a VPN over a network in accordance with an embodiment of the present invention.

FIG. 1. is an illustration of a system 100 for automatically connecting to a VPN over a network in accordance with an embodiment of the present invention. System 100 includes a first VPN 102 and a second VPN 104. The first VPN 102 and second VPN 104 are coupled to a network 106. First VPN 102 and second VPN 104 provide access from the network 106 to a private network 230 (not shown in FIG. 1 but shown in FIG. 2). Illustratively, the network 106 is a public network such as the internet. However, network 106 may also be another private network. VPNs 102 and 104 may be coupled to the network 106 directly, for example via an Ethernet cable or via a wireless connection such as WiFi. VPNs 102 and 104 may also be coupled to the network 106 indirectly through another device (not shown), such as, but not limited to, as a router, a switch, a hub, a separate computer system, a server system, a mobile device, and/or a modem. In other words, the first VPN 102 and the second VPN 104 may be coupled to the network 106 in any way known to a person having skill in the art. It is also expressly contemplated that the first VPN 102 is coupled to the network 106 in a different manner than the second VPN 104.

Further coupled to the network 106 is a computing device 108. Similar to VPNs 102 and VPN 104, the coupling between the network 106 and the computing device 108 may be direct or indirect and may be made in any way known to a person having skill in the art. The computing device 108 includes a first processor 110 which is coupled to a first memory 112. The first processor is configured to execute portions of the method described below in detail with reference to FIG. 3.

A server system 114 is also coupled to the network 106. Similar to VPNs 102 and VPN 104 and the computing device 108, the coupling between the network 106 and the server system 114 may be direct or indirect and may be made in any way known to a person having skill in the art. The server system 114 includes a second processor 116 which is coupled to a second memory 118. The second processor is configured to determine and provide availability indicia as described below in detail with reference to FIG. 3.

Figure 2:
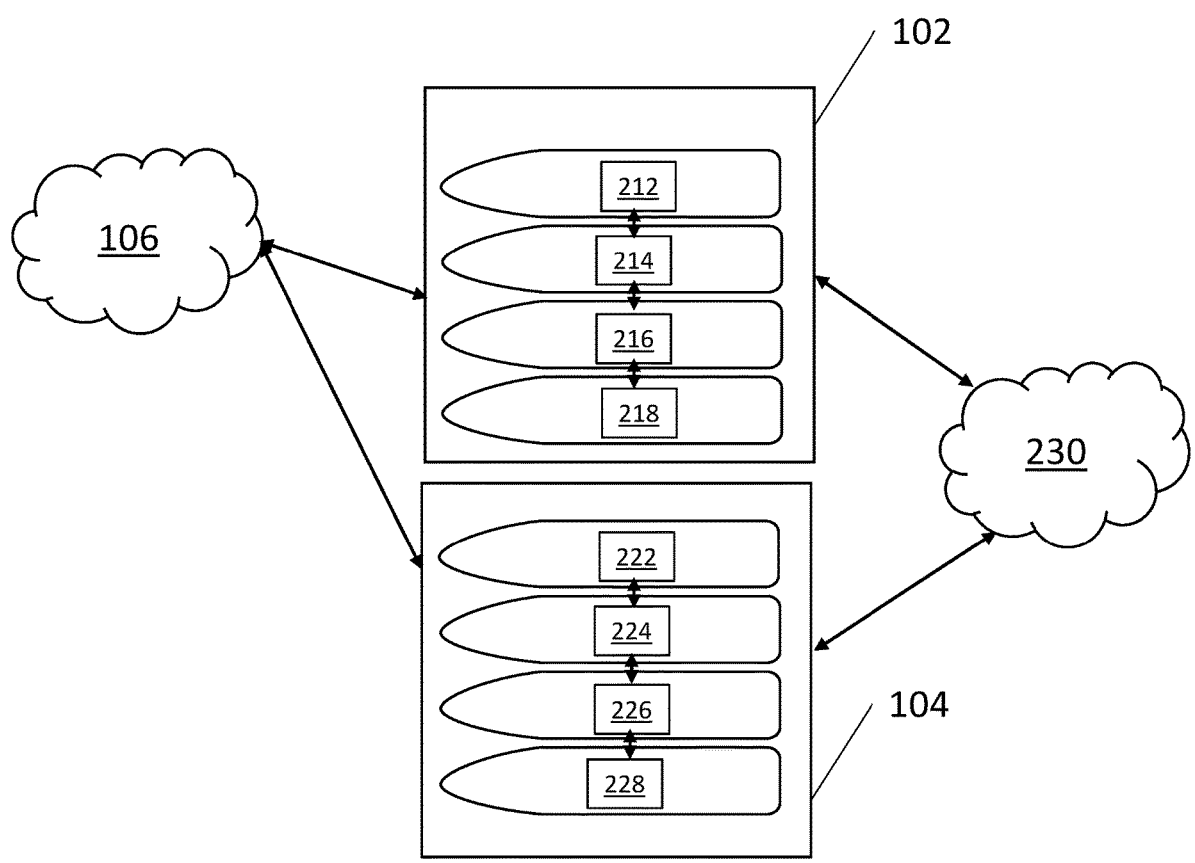
FIG. 2 is an illustration of an exemplary virtual private network infrastructure.

FIG. 2 is an illustration of an exemplary virtual private network infrastructure. As shown above in FIG. 1, the first VPN 102 and the second VPN 104 are coupled to the network 106. By way of illustration, the first VPN 102 is shown to include four connection zones 212, 214, 216, and 218. The second VPN 104 is also shown to include four zones 222, 224, 226, and 228. However, it is expressly contemplated that each VPN has less or more than four zones, and/or that the first VPN 102 has a different number of zones than the second VPN 104. The first VPN 102 and the second VPN 104 further are coupled to a private network 230. The private network 230 exemplarily may be a corporate or company network that a user connected to the public network 106 wishes to access.

By way of illustration, the zones 212, 214, 216, 218, 222, 224, 226, and 228 may each correspond to a server that provides a VPN service for the user to access the private network 230. Each zone may be housed in a separate datacenter, or a plurality of zones may be housed in the same datacenter. It is expressly noted that the configuration of servers, zones, and data centers is extremely flexible and can be adjusted as needed. For example, two zones may reside on the same server and/or data center, or a zone may be split across more than one data center.

Figure 3:
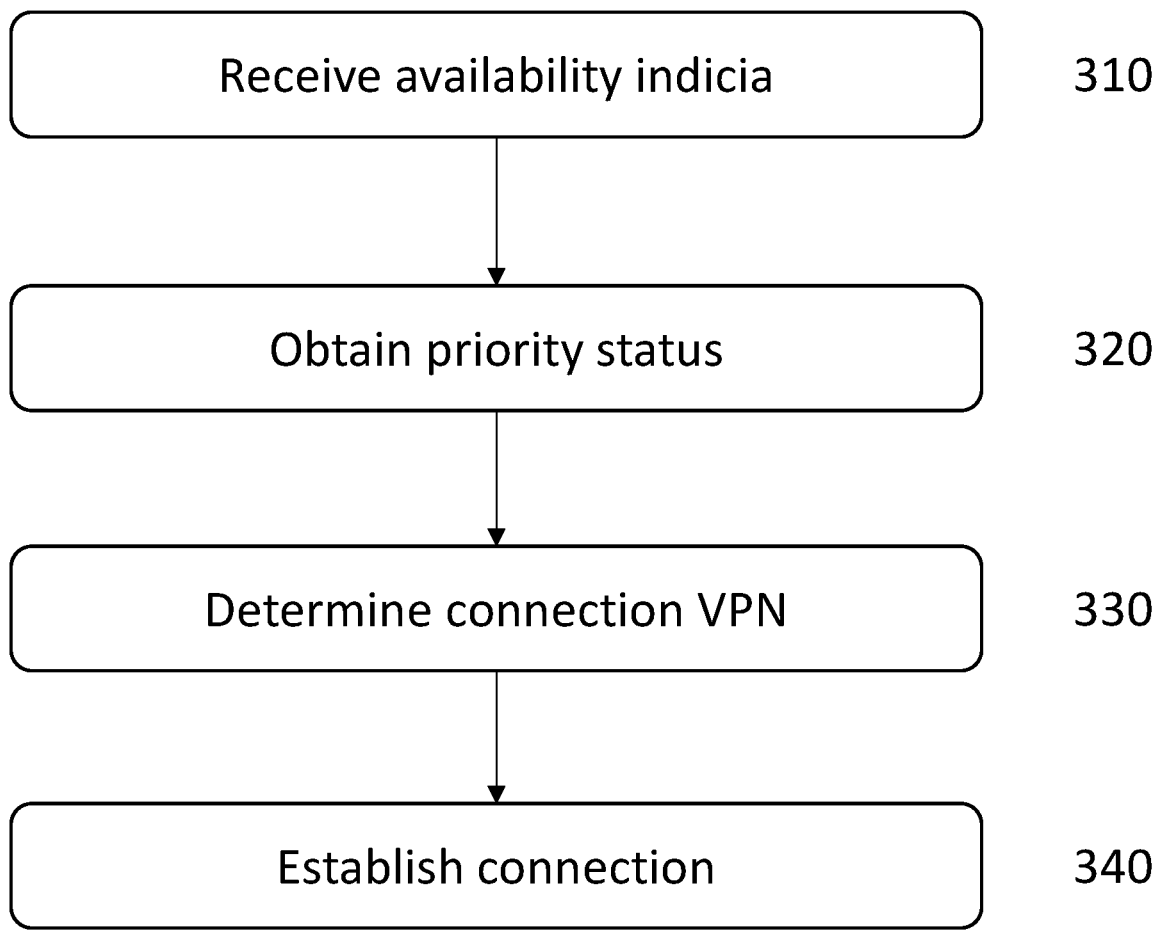
FIG. 3 is a flowchart of a method for automatically connecting to a VPN over a network in accordance with an embodiment of the present invention.

FIG. 3 is a flowchart of a method 300 for automatically connecting computing device 108 to a VPN over network 106 in accordance with another embodiment of the present invention. In the present description, the VPN to connect to is either the first VPN 102 or the second VPN 104. However, it is expressly contemplated that the VPN is selected from a set having more than two VPNs and/or that the first VPN 102 and the second VPN 104 are selected from a set having more than two VPNs.

The method 300 may be executed by the first processor 110 of the computing device 108. The method 300 may be executed while establishing a connection from the computing device 108 over the network 106 to one of the first and second VPNs 102 and 104. For example, the method 300 may be executed in parallel with establishing the connection. The method 300 may alternatively executed upon loss of a connection between the computing device 108 and one of the first and second VPNs 102 and 104 over the network 106. In addition, the method 300 may be executed by the computing device 108 periodically, such as once every minute, even if a connection to one of the VPNs 102 and 104 is already established.

The method 300 may be performed by a VPN access service executed by the first processor 110 and residing in first memory 112. For example, the VPN access service may be started when the operating system of the computing device 108 is initialized. The VPN access service then remains in memory until the computing device 108 is shut down and is available to perform the method 300 as required. The VPN access service that performs the method 300 may be implemented in any suitable programming language known to the skilled person, such as C#. In some embodiments, the VPN access service that performs the method 300 does not change any operating system settings while establishing a connection or switching between VPNs. Illustratively, when the method 300 causes a switch from the first VPN 102 to the second VPN 104, the VPN access service may terminate the connection to the first VPN 102 by terminating a program or service that provides access to the first VPN 102. Then, the VPN access service may establish a connection to the second VPN 104 by starting a program or service that provides access to the second VPN 104. In this way, the method 300 may switch between VPNs without affecting the network connection settings of the operating system of the computing device 108.

In step 310, the computing device 108 receives availability indicia from a server system 114 over the network 106. Illustratively, the server system 114 determines the availability indicia based on a plurality of connection zones, such as the zones described above with reference to FIG. 2. For example, the availability indicia may correspond to a number of zones of the connection zones that are unreachable over the network 106. The availability indica may be a single number for one of the VPNs, a single number for both VPNs, or the indicia may include a separate number for each VPN. Using the example topology shown above in FIG. 2, the availability indicia may correspond to the number of zones 212, 214, 216, and 218 of the first VPN 102 that are unreachable over the network 106. Whether a zone is unreachable may be determined in any way known to a person skilled in the art and compatible with the infrastructure of the first and/or second VPNs 102 and 104. For example, reachability may be determined by attempting to connect to a certain port of an access device representing each one of the zones. In the example given here, the server system 114 attempts to connect to a port, such as port 443, on each one of four access devices corresponding to the four zones 212, 214, 216, and 218 of the first VPN 102. The port may be the same for each one of the access devices, or it may vary across the access devices. If the connection attempt is successful, the corresponding zone is determined to be reachable. If the connection attempt is unsuccessful, the corresponding zone is determined to be unreachable. In other embodiments, the server system 114 may attempt to ping each one of the access devices instead of or in addition to attempting to connect to certain ports. For example, if the attempt to connect to port 443 on an access device is unsuccessful, the server system 114 may then attempt to ping that access device. This allows the server system 114 to differentiate between two different scenarios: If both the attempt to connect to port 443 and the attempt to ping the access device are unsuccessful, the server system 114 may determine that the access device is offline or unreachable over the network 106. If the attempt to connect to port 443 is unsuccessful but the ping is successful, the server system 114 may determine that the access device is online and reachable over the network 106, but that a VPN service running on the access device is unreachable. The VPN service may be unreachable for any reason known to the skilled person, such as it may not have been started yet, it may have been stopped, it may have crashed, it may have run out of resources, etc. In some embodiments, the server system 114 may cause an alert to notify an operator of the VPN of the status of the access device and the VPN service, and/or the server system 114 may cause another action to restore access. For example, the server system 114 may cause a restart of the VPN service and/or a reboot of the access device.

The availability indicia may then correspond to the number of unreachable zones. For example, if a single zone, such as zone 212, is unreachable, the availability indicia may be 1. If two zones, such as zones 212 and 214, are unreachable, the availability indicia may be 2. If three zones, such as zones 212, 214 and 216, are unreachable, the availability indicia may be 3, and so forth. While the availability indicia here is shown to reflect the number of unavailable zones, the availability indicia may also alternatively reflect the number of available zones. In that case, the availability indicia may be 3 if a single zone is unreachable, 2 if two zones are unreachable, and 1 if three zones are unreachable. The server system 114 may update the availability indicia periodically, such as once every minute. The portion of the method that is executed on the server system 114 may illustratively by written in a language that allows a straightforward implementation of a server process, such as a server-side script running under Node.js. The Node.js daemon may be executed periodically, such as once a minute, using cron. The Node.js daemon may provide the availability status through REST (representational state transfer). REST, as a machine-to-machine interface, allows the portion of the method that is executed on the computing device 108 to query and receive the availability indicia in an effortless manner, such as via a simple HTTP (hypertext transfer protocol) request without having to provide a dedicated API.

In step 320, the computing device 108 obtains a priority status. The priority status may correspond to the computing device and/or to the user logged in to the computing device. The priority status may indicate one of a high priority and a low priority. However, it is expressly noted that the priority status may also refer to more than two priority levels. The computing device 108 may receive the priority status from another server or computing device over the network 106. Alternatively, the priority status may be stored on the computing device, for example in memory 112. The priority status may also be obtained from a storage medium or from any other device coupled the computing device 108.

In step 330, the computing device 108 determines a connection VPN. In the example given here, the connection VPN is either the first VPN 102 or the second VPN 104. However, as stated above, the connection VPN may also be determined from a set that includes more than two VPNs. The computing device 108 determines the connection VPN based on at least one of the availability indicia and the priority status.

Illustratively, the first VPN 102 is prioritized over the second VPN 104. This means that if the priority status reflects a high priority, the connection VPN is always determined to be the first VPN 102 if at least one zone of the first VPN is available. If no zone of the first VPN is available, the connection VPN may be the second VPN 104. If the priority status reflects a low priority, the connection VPN is determined based on the availability indicia. In the case of the availability indicia reflecting the number of unavailable zones, the connection VPN is determined to be the first VPN 102 if the availability indicia are lower than a threshold. If the availability indicia are equal to or higher than the threshold, the connection VPN is determined to be the second VPN 104. If the availability indicia reflect the number of available zones, the connection VPN is determined to be the first VPN 102 if the availability indicia are higher than a threshold. The connection VPN is determined to be the second VPN 104 if the availability indicia are lower than or equal to the threshold.

The threshold may be determined based on the capacity of the given infrastructure, such as the capacity of the different zones of the first VPN, and the business needs to provide access to high-priority and low-priority users and/or computing devices. Illustratively, referring to the four zones of the primary VPN from the example above, each zone may be able to handle 40,000 connections. The business may have 70,000 mobile devices/users. If one zone is unreachable, i.e., the availability indicia are 1, the remaining three zones can handle 120,000 connections, which is more than the connections needed. Therefore, all users connect to the primary VPN. If two zones are unreachable, i.e., the availability indicia are 2, the remaining two zones can handle 80,000 connections, which is more than the connections needed. All users still connect to the primary VPN. If three zones are unreachable, i.e., the availability indicia are 3, the remaining zone can only handle 40,000 connections. The other 30,000 computing devices/users, based on their priority being low, are switched to the secondary VPN. Therefore, in this case the threshold is set at 3. The threshold may be determined dynamically, for example by the server system 114. The server system 114 may determine the threshold based on the infrastructure, as described above, while also considering the current capacity of the primary VPN. The capacity of the primary VPN may be temporarily reduced because of portions of zones being offline, maintenance, or other reasons. Even though the threshold may normally be set at 3, the server system 114 may therefore reduce the threshold to a lower number to allow for the temporarily reduced capacity of the primary VPN. For example, the server system 114 may reduce the threshold to 2 until the full capacity of the primary VPN is restored. The server system 114 may provide the threshold to the computing device through REST as part of the availability indicia.

In step 340, the computing device establishes a connection to the connection VPN over the network. This connection may be established immediately after determining the connection VPN. In other embodiments, the connection may be established after a delay to prevent a large number of users attempting to connect to the same VPN at the same time when a sufficient number of zones fail. For example, when users are switched from the first VPN to the second VPN because of a sufficient number of failed zones in the first VPN, the connection to the second VPN may be delayed by several seconds to avoid too many connection attempts at the same time. The delay may be a random number in a preselected range, such as a random delay between 5 and 10 seconds. The delay may also or in addition be based on the time when the method 300 receives the availability indicia.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A method for automatically connecting a computing device to a virtual private network (VPN), the method comprising:
   receiving a request to connect to the VPN, wherein the VPN includes one or more VPN groups that each have one or more connection zones, and wherein the one or more VPN groups are associated with a different priority level;
   receiving one or more availability indicia after determining that the computing device is associated with a first priority level, wherein each of the one or more availability indicia indicates a number of connection zones of a corresponding VPN group that are unreachable;
   identifying a first available VPN group having an availability indicium that is equal to or greater than a threshold, wherein the identification is performed starting from a VPN group having the highest priority level to a VPN group having the lowest priority level; and
   connecting to a connection zone provided by the first available VPN group.

2. The method of claim 1, wherein the computing device is associated with a second priority level, in which the second priority level is higher in priority than the first priority level.

3. The method of claim 2, further comprising:
   determining the VPN group having the highest priority level; and
   connecting to a connection zone provided by the VPN group having the highest priority level.

4. The method of claim 2, further comprising:
determining the VPN group having the highest priority level;
determining that all of the connection zones provided by the VPN group having the highest priority level are unavailable;
identifying a second available VPN group having one or more connection zones that are available, wherein the identification is performed starting from a VPN group having the next highest priority level, relative to the VPN group with the highest priority level, to a VPN group having the lowest priority level; and
connecting to a connection zone provided by the second available VPN group.

5. The method of claim 1, wherein the availability indicia is periodically updated by identifying availability of the one or more connection zones for each of the one or more VPN groups.

6. The method of claim 1, further comprising:
determining that the connection zone provided by the first available VPN group is unreachable after connecting for an indeterminate amount of time; and
automatically connecting to the next available VPN group that has available connection zones based on at least one of the priority level of the computing device, the priority level of the next available VPN group, and the availability indicia.

7. The method of claim 1, wherein the priority level of the computing device is stored on the computing device, and is associated with at least one of the computing device and the user account associated with the computing device.

8. The method of claim 1, wherein a specific connection zone of the one or more connection zones is determined to be unreachable after unsuccessfully performing at least one of attempting to ping and connect to a port associated with the specific connection zone.

9. The method of claim 8, further comprising:
transmitting an alert notifying a status of an unreachable connection zone.

10. The method of claim 8, further comprising:
restoring access to the unreachable connection zone by performing at least one of restarting a VPN service associated with the unreachable connection zone and rebooting one or more access devices associated with the unreachable connection zone.

11. A system comprising:
a virtual private network (VPN) including one or more VPN groups that each have one or more connection zones, wherein the one or more VPN groups are associated with a different priority level;
a computing device having one or more modules maintained on one or more computer-readable media, that when executed by one or more processors, cause the one or more processors to perform operations including:
receiving a request to connect to the VPN including one or more VPN groups that each have one or more connection zones, wherein the one or more VPN groups are associated with a different priority level;
receiving one or more availability indicia after determining that the computing device is associated with a first priority level, wherein each of the one or more availability indicia indicates a number of connection zones of a corresponding VPN group that are unreachable;
identifying a first available VPN group having an availability indicium that is equal to or greater than a threshold, wherein the identification is performed starting from a VPN group having the highest priority level to a VPN group having the lowest priority level; and
connecting to a connection zone provided by the first available VPN group.

12. The system of claim 11, wherein the computing device is associated with a second priority level, in which the second priority level is higher in priority than the first priority level.

13. The system of claim 12, wherein the one or more computer-readable media cause the one or more processors to perform further operations including:
determining the VPN group having the highest priority level; and
connecting to a connection zone provided by the VPN group having the highest priority level.

14. The system of claim 12, wherein the one or more computer-readable media cause the one or more processors to perform further operations including:
determining the VPN group having the highest priority level;
determining that all of the connection zones provided by the VPN group having the highest priority level are unavailable;
identifying a second available VPN group having one or more connection zones that are available, wherein the identification is performed starting from a VPN group having the next highest priority level, relative to the VPN group with the highest priority level, to a VPN group having the lowest priority level; and
connecting to a connection zone provided by the second available VPN group.

15. The system of claim 11, wherein the availability indicia is periodically updated by identifying availability of the one or more connection zones for each of the one or more VPN groups.

16. The system of claim 11, wherein the one or more computer-readable media cause the one or more processors to perform further operations including:
determining that the connection zone provided by the first available VPN group is unreachable after connecting for an indeterminate amount of time; and
automatically connecting to the next available VPN group that has available connection zones based on at least one of the priority level of the computing device, the priority level of the next available VPN group, and the availability indicia.

17. The system of claim 11, wherein the priority level of the computing device is stored on the computing device, and is associated with at least one of the computing device and the user account associated with the computing device.

18. The system of claim 11, wherein a specific connection zone of the one or more connection zones is determined to be unreachable after unsuccessfully performing at least one of attempting to ping and connect to a port associated with the specific connection zone.

19. A non-transitory computer-readable medium having instructions that, when executed by a computing device, cause the computing device to:
receive a request to connect to a VPN, wherein the VPN includes one or more VPN groups that each have one or more connection zones, and wherein the one or more VPN groups are associated with a different priority level;
receive one or more availability indicia after determining that the computing device is associated with a first priority level, wherein each of the one or more availability indicia indicates a number of connection zones of a corresponding VPN group that are unreachable;

identify a first available VPN group having an availability indicium that is equal to or greater than a threshold, wherein the identification is performed starting from a VPN group having the highest priority level to a VPN group having the lowest priority level; and connect to a connection zone provided by the first available VPN group.

20. The non-transitory computer-readable medium of claim 19, wherein the computing device is associated with a second priority level, in which the second priority level is higher in priority than the first priority level, and wherein the instructions further cause the computing device to:

determining the VPN group having the highest priority level;

determining that all of the connection zones provided by the VPN group having the highest priority level are unavailable;

identifying a second available VPN group having one or more connection zones that are available, wherein the identification is performed starting from a VPN group having the next highest priority level, relative to the VPN group with the highest priority level, to a VPN group having the lowest priority level; and connecting to a connection zone provided by the second available VPN group.

* * * * *